United States Patent
Hart et al.

(10) Patent No.: US 7,414,973 B2
(45) Date of Patent: Aug. 19, 2008

(54) COMMUNICATION TRAFFIC MANAGEMENT SYSTEMS AND METHODS

(75) Inventors: Neil Darren Hart, Chelsea (CA); Paul Thomas Kondrat, Ottawa (CA); David Martin Harvey, Kanata (CA); Shafiq Pirbhai, Kanata (CA); Shawn McAllister, Manotick (CA); Mark Alexander Leith Smallwood, Beaconsfield (GB)

(73) Assignee: Alcatel Lucent, Paris (FR)

( * ) Notice: Subject to any disclaimer, the term of this patent is extended or adjusted under 35 U.S.C. 154(b) by 643 days.

(21) Appl. No.: 11/041,586

(22) Filed: Jan. 24, 2005

(65) Prior Publication Data

US 2006/0164989 A1 Jul. 27, 2006

(51) Int. Cl.
*G01R 31/08* (2006.01)
(52) U.S. Cl. .................... 370/235; 370/395.2
(58) Field of Classification Search ............. 370/229, 370/230, 230.1, 235, 278, 282, 395.21, 351, 370/352, 353, 354, 356
See application file for complete search history.

(56) References Cited

U.S. PATENT DOCUMENTS 6,333,917 B1 12/2001 Lyon et al.
2002/0057650 A1* 5/2002 Chuah et al. ............ 370/232
2003/0185154 A1* 10/2003 Mullendore et al. ...... 370/230
2004/0071086 A1* 4/2004 Haumont et al. ......... 370/230

FOREIGN PATENT DOCUMENTS

EP 1249972 10/2002

* cited by examiner

*Primary Examiner*—Chirag G Shah
*Assistant Examiner*—Nima Mahmoudzadeh
(74) *Attorney, Agent, or Firm*—Kirk D. Houser; Arnold B. Silverman; Eckert Seamans Cherin & Mellott, LLC

(57) ABSTRACT

Communication traffic management systems and methods are disclosed. A threshold status of a communication traffic queue of a second communication traffic management device which is capable of receiving communication traffic from a first communication traffic management device is determined, by comparing a depth of the queue to a corresponding threshold for instance. A rate of transfer of communication traffic to the second device, and possibly to particular queues of the second device from corresponding queues of the first device, is controlled based on the threshold status. Transmission of communication traffic from the queues of the second device may thus be in accordance with one communication traffic management scheme, whereas the content of each queue of the second device is controlled according to another communication traffic management scheme used by the first device to transfer communication traffic from its queues, to thereby provide for complex combined communication traffic management.

8 Claims, 3 Drawing Sheets

COMMUNICATION TRAFFIC MANAGEMENT SYSTEMS AND METHODS

FIELD OF THE INVENTION

This invention relates generally to communications and, in particular, to management of communication traffic.

BACKGROUND

When providing Asynchronous Transfer Mode (ATM) access on a communication switch or router capable of sophisticated Layer 3 communication traffic management, as is often the case in communication systems, it is generally desirable to allow outgoing customer communication traffic to be subject to communication traffic management at both Layer 3, typically Internet Protocol (IP), and Layer 2 (ATM). In other words, a service provider may wish to shape or rate limit different classes of IP traffic separately, and then shape the aggregate flow in conformance with an ATM traffic descriptor.

However, ATM traffic management is typically provided through specialized hardware that is also responsible for cell segmentation and reassembly, while IP traffic management may use the same hardware as is used for other access technologies at a switch or router. Relatively generic and costly hardware which supports various technologies such as IP may therefore be provided in multiple circuit card slots of a switch or router. Any of a variety of types of less costly medium- or protocol-specific access technology modules such as line cards are then connected to the generic hardware to provide an interface to a lower layer protocol for each circuit card slot. The same routing hardware may thus be used with different access technology modules.

In advanced communication switches or routers, communication traffic management at both Layer 3 (L3), to enable different communication traffic handling for different Differentiated Service Code Point (DSCP) codepoints for instance, and Layer 2 (L2), such as shaping in conformance with an ATM traffic descriptor, may be achieved through the use of specialized hardware that combines L3 and L2 communication traffic management in either a single communication device or a small number of devices that were designed to work together.

Hardware hierarchical ATM traffic management devices, for example, support multiple levels of hardware scheduling decisions that first decide whether a given ATM Virtual Circuit (VC) should be allowed to transmit, typically based on a weighted-round robin for scheduled ATM traffic or a slot-based shaping wheel for shaped ATM traffic, and then decide which L3 class-based queues constituting that VC should be allowed to transmit, based on strict priority of some classes over others, weighted round-robin or simple round-robin, or some combination of all three. If ATM traffic management is implemented in a separate communication device from the L3 traffic management, then there will typically be per-VC queuing in the ATM device and a per-VC backpressure mechanism from the ATM device to the L3 device to govern when L3 queues corresponding to a given VC should be allowed to transmit. In the latter scenario, the hardware backpressure mechanism must be able to support backpressure on thousands of contexts, which rules out standard buses such as System Packet Interface (SPI) 4.2, which is limited to 255 backpressure contexts.

When budget, time-to-market, or other constraints preclude the creation of specialized hardware, it may be necessary to combine L3 and L2 communication devices which were not designed to work together. Existing techniques for combined multi-layer communication traffic management do not deal with the problem of interconnecting separate traffic management devices. In this type of implementation, a particular traffic management device typically would not provide backpressure to a different traffic management device at all. Instead, each traffic management device discards communication traffic as queues exceed configured thresholds or if buffer pool exhaustion, indicative of high total queue occupancy, occurs. In the above example of L3 and ATM traffic management, the ATM traffic management device would discard communication traffic as its per-VC queues fill up. These discards are not L3 class-aware, with communication traffic of any particular L3 class just as likely to be discarded as communication traffic of any other L3 class, thereby effectively defeating the L3 traffic management.

Known communication traffic management techniques thus require that an ATM traffic management device either be integrated into or specially designed to operate with an L3 device in order to preserve any benefit of L3 traffic management. These techniques are therefore not suitable for adding ATM to existing communication equipment which already has an L3 traffic management device. This situation may arise during a product development cycle which, due to budget or time-to-market constraints, must use existing hardware devices.

Accordingly, there remains a need for a communication traffic management mechanism which allows the use of different traffic management devices to accomplish complex traffic management without using specialized hardware.

SUMMARY OF THE INVENTION

Embodiments of the invention provide communication traffic management mechanisms whereby traffic management can be applied at Layer 3 and at Layer 2, for example, using a feedback mechanism to ensure that an aggregate output of a traffic manager in a Layer 3 communication device is suitable for an ATM traffic manager in an ATM communication device.

According to one aspect of the invention, there is provided a system for managing transfer of communication traffic between communication traffic management devices which employ respective communication traffic management schemes. A first one of the communication traffic management devices is capable of transferring communication traffic to a second one of the communication traffic management devices. The system includes a queue threshold status detector which is configured to determine whether an amount of communication traffic currently stored in a communication traffic queue of the second communication traffic management device exceeds a threshold, and a transfer rate control module operatively coupled to the queue threshold status detector. The transfer rate control module is configured to apply transfer rate control to the first communication traffic management device, based on whether the amount of communication traffic exceeds the threshold, to control a rate of transfer of communication traffic to the second communication traffic management device.

In one embodiment, the first communication traffic management device is an IP communication traffic management device, and the second communication traffic management device is an ATM communication traffic management device.

The first communication traffic management device may include multiple queues for storing communication traffic received from at least one communication traffic source, and the second communication traffic management device may include multiple queues for storing communication traffic received from at least one corresponding queue of the first communication traffic management device. In this case, the queue threshold status detector is preferably configured to determine, for each of at least one of the queues of the second communication traffic management device, whether the amount of communication traffic currently stored in the queue exceeds a respective threshold associated with the queue. The transfer rate control module is configured to apply transfer rate control to the first communication traffic management device based on whether the amount of communication traffic stored in each of the at least one queue exceeds the threshold associated with the queue, to control a rate of transfer of communication traffic to the second communication traffic management device from the at least one corresponding queue of the first communication traffic management device.

In some embodiments, the second communication traffic management device is configured to output to the queue threshold status detector respective queue depths indicating the amount of communication traffic stored in each of its queues.

The multiple queues of the first and second communication traffic management devices may include sets of priority queues for storing communication traffic having respective priorities.

One possible implementation of the queue threshold status detector is a Field Programmable Gate Array (FPGA) which is configured to determine the amount of communication traffic currently stored in the communication traffic queue and to compare the amount of communication traffic currently stored in the communication traffic queue to the threshold.

Software-based implementations are also possible, in which at least the transfer rate control module is implemented in software for execution by a processor.

At least one of the queue threshold status detector and the transfer rate control module may be implemented with the second communication traffic management device on a circuit card for use in communication equipment which includes hardware implementing the first communication traffic management device.

The queue threshold status detector may be further configured to determine a total amount of communication traffic currently stored in multiple communication traffic queues of the second communication traffic management device, to adjust a predetermined threshold based on the total amount of communication traffic, and to use the adjusted predetermined threshold as the threshold.

Multiple thresholds may be established for a queue in accordance with some embodiments. The rate of transfer of communication traffic to the queue may then be reduced if the amount of communication traffic stored in the queue exceeds a first threshold, and subsequently increased when the amount of communication traffic stored in the queue is below a second threshold.

Preferential treatment of queues is also provided in some embodiments by maintaining a record of at least one of: (i) each of the queues of the second traffic management device and (ii) each of the queues of the first traffic management device for which transfer rate control has been applied to reduce the rate of transfer of communication traffic to the second communication device. Transfer rate control may then be applied for each of the queues for which transfer rate control has been applied to reduce the rate of transfer of communication traffic, before queues for which transfer rate control has not been applied to reduce the rate of transfer of communication traffic.

Transfer rate control may also be based on queue threshold status changes, by determining whether a current threshold status of a communication traffic queue of the second communication traffic management device has changed from a previous threshold status of the communication traffic queue. The threshold status of a communication traffic queue is indicative of the amount of communication traffic stored in the communication traffic queue relative to the threshold. Transfer rate control is then applied where the current threshold status of the communication traffic queue of the second communication traffic management device has changed from the previous threshold status of the communication traffic queue.

Embodiments of the invention may be applied to control a transfer rate of communication traffic between more than two communication traffic management devices. For example, the first communication traffic management device may be capable of receiving communication traffic from a third communication traffic management device. Transfer rate control may be applied to the third communication traffic management device based on a determination of whether an amount of communication traffic currently stored in a communication traffic queue of the first communication traffic management device exceeds a threshold.

According to a further aspect of the present invention, a communication traffic management method for managing transfer of communication traffic between communication traffic management devices is provided. The communication traffic management devices employ respective communication traffic management schemes, and a first of the communication traffic management devices is capable of transferring communication traffic to a second of the communication traffic management devices. The method includes determining whether an amount of communication traffic currently stored in a communication traffic queue of the second communication traffic management device exceeds a threshold, and applying transfer rate control to the first communication traffic management device, based on the determination, to control a rate of transfer of communication traffic to the second communication traffic management device.

The determining and applying operations may be performed substantially as described briefly above, for example. Further embodiments of the invention may involve additional operations, including at least those described above.

Yet another aspect of the invention provides a communication traffic management method which includes receiving communication traffic from at least one communication traffic source, transferring the received communication traffic, in accordance with a first communication traffic management scheme, for processing in accordance with accordance with a second communication traffic management scheme, and applying transfer rate control to the first communication traffic management scheme, based on an amount of communication traffic to be processed in accordance with the second communication traffic management scheme, to control a rate of transfer of further communication traffic for processing in accordance with the second communication traffic management scheme.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
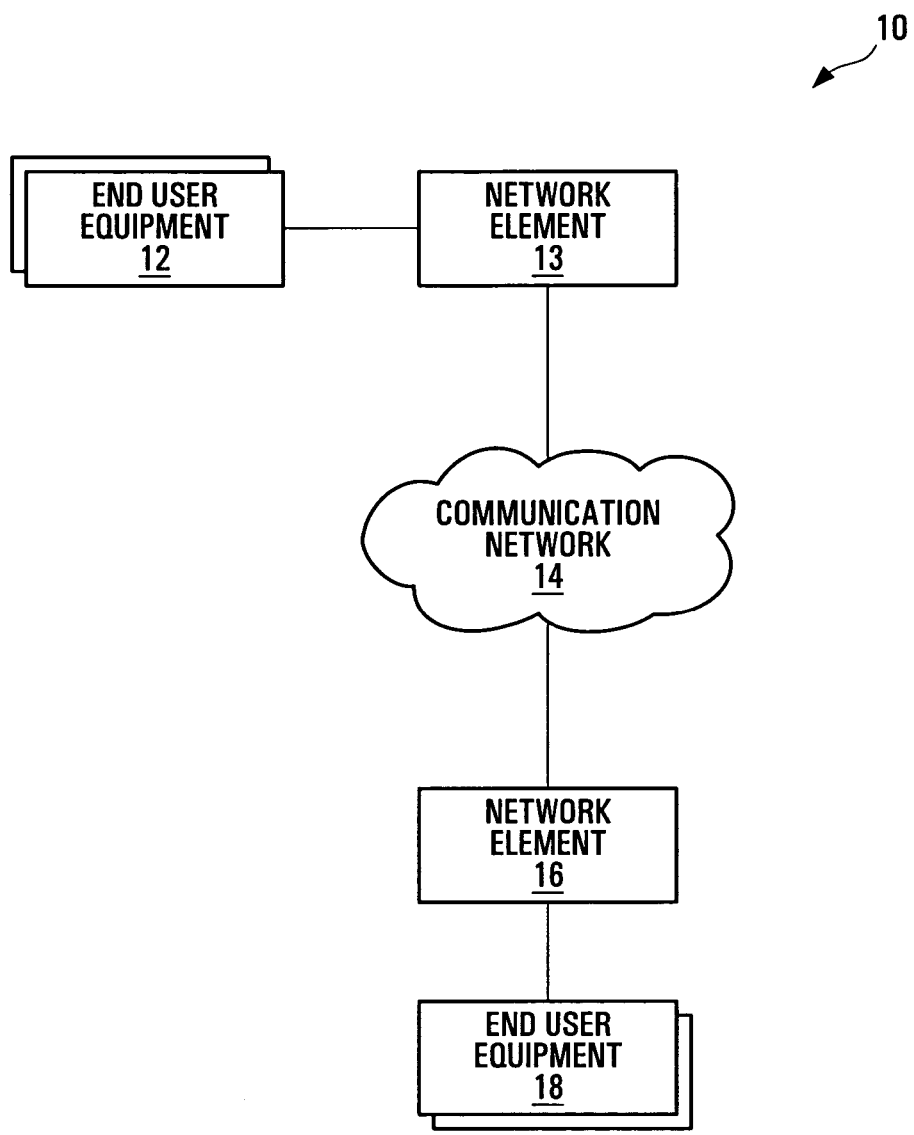
FIG. 1 is a block diagram of a communication system in which embodiments of the invention may be implemented.

FIG. 1 is a block diagram of a communication system in which embodiments of the invention may be implemented. The communication system 10 in FIG. 1 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 18 represents communication equipment which is configured to generate and transmit and/or receive and terminate communication traffic. Although shown as being directly connected to the network elements 13, 16, it will be apparent that end user equipment 12, 18 may communicate with the network elements 13, 16 through other intermediate components (not shown).

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include intermediate network elements which route communication traffic through the communication network 14.

Many different types of end user, intermediate, and network communication equipment, as well as the operation thereof, will be apparent to those skilled in the art. In general, communication traffic originating with end user equipment 12, 18, and possibly other sources of communication traffic, for transfer to a remote destination through the communication network 14 is received by a network element 13, 16, translated between different protocols or formats if necessary, and routed through the communication network 14. In one particular embodiment, the network elements 13, 16 exchange ATM traffic with the end user communication equipment 12, 18, whereas the communication network 14 is an IP network. However, as will become apparent from the following description, embodiments of the invention are not limited to any particular types of communication equipment, transfer mechanisms, or protocols.

One common type of installation for communication network equipment such as the network elements 13, 16 includes an equipment rack having multiple slots. As described above, each slot may include generic hardware for supporting communications with the communication network 14. A line card is then used in each slot to provide a medium- or protocol-specific interface. Using this kind of architecture, it tends to be easier to maintain spares for medium-specific modules in case of equipment failure, and substantially the same hardware core may be used in conjunction with various medium-specific modules.

As described above, known techniques for combined multi-layer communication traffic management involve integration of different technologies or the use of custom hardware which has been specifically designed for inter-operation. The cost associated with replacing existing generic hardware in the network elements 13, 16 to support combined communication traffic management is not generally feasible. Even for new equipment installations, cost, time, and other constraints may preclude custom hardware design.

Multi-layer communication traffic management techniques which avoid these drawbacks are provided in accordance with embodiments of the invention disclosed herein.

Figure 2:
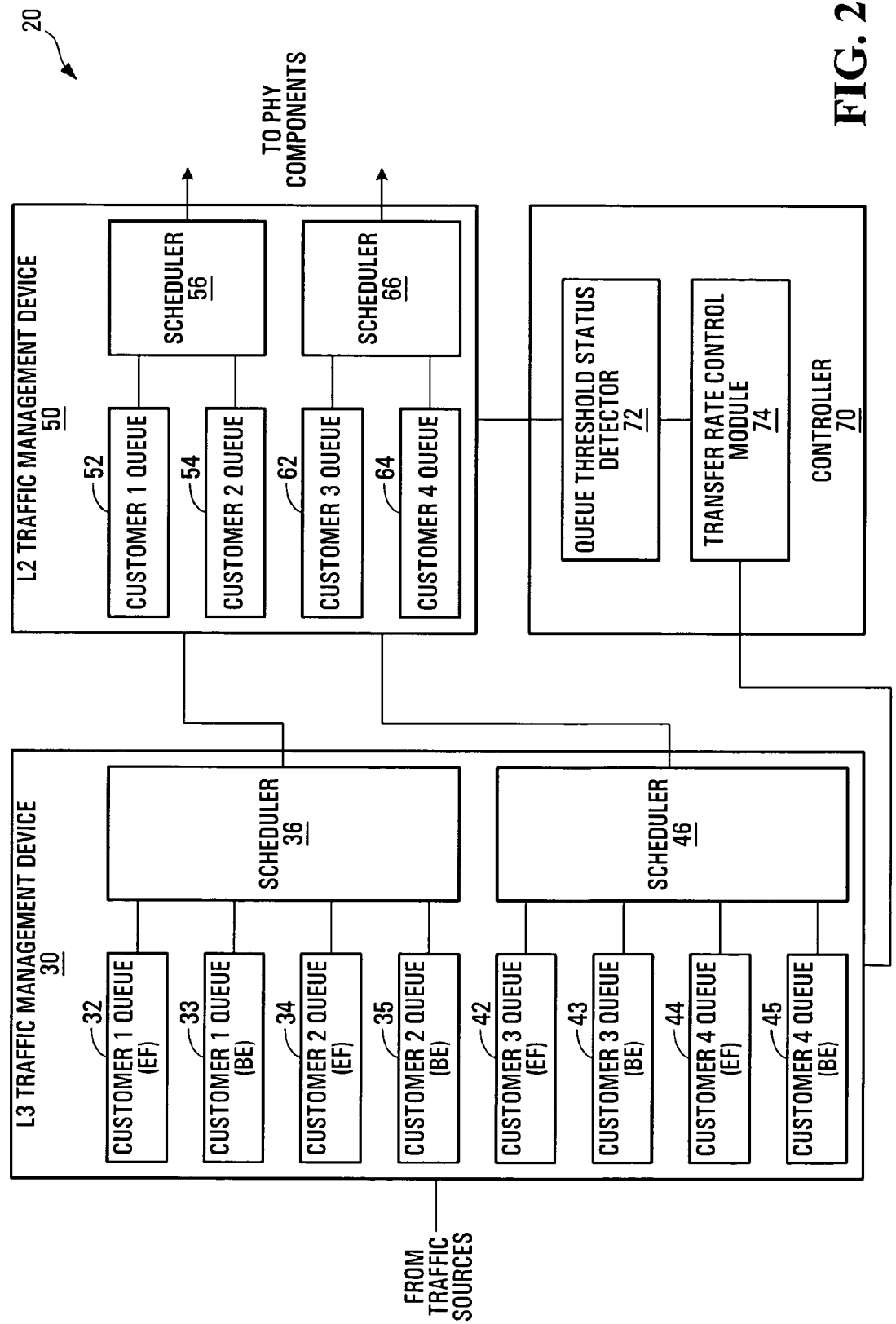
FIG. 2 is a block diagram of an illustrative example communication network element incorporating an embodiment of the invention.

FIG. 2 is a block diagram of an illustrative example communication network element incorporating an embodiment of the invention. The communication network element 20 includes an L3 traffic management (TM) device 30 connected to an L2 TM device 50 and a controller 70 which is connected to both TM devices 30, 50.

Each of the TM devices 30, 50 includes multiple queues 32-35, 42-45, and 52, 54, 62, 64 and schedulers 36, 46 and 56, 66. The L3 TM device 30 includes two queues per communication traffic source, specifically an Expedited Forwarding (EF) and Best Effort (BE) queue for each of four customers in the example shown in FIG. 2, and one scheduler 36, 46 for each of two physical ports over which communication traffic is sent to the L2 TM device 50. The L2 TM device 50 includes one queue 52, 54, 62, 64 for each Virtual Circuit (VC) through which communication traffic is to be transmitted, with one scheduler 56, 66 for each of two physical ports. The above numbers of queues, VCs, and physical ports are intended solely as illustrative examples. The invention is in no way limited thereto.

In the embodiment shown in FIG. 2, the controller 70 includes a queue threshold status detector 72 and a communication traffic transfer rate control module 74.

Those skilled in the art will appreciate that a network element may include many more components than shown in FIG. 2, which perform other functions than traffic management. For example, pre-TM processing may be performed by L3 and L2 communication devices in which the L3 and L2 TM devices 30, 50 are incorporated. In particular example embodiments, the network elements 13, 16 exchange traffic over ATM or Synchronous Optical Network (SONET), using Packet over SONET (POS) mechanisms for instance, with the end user communication equipment 12, 18, whereas the communication network 14 is an IP network. In this case, pre-TM processing by the ATM communication device may include reformatting communication traffic output by the L3 TM device 30 into ATM cells for storage in the queues 52, 54, 62, 64. Since the present invention relates to traffic management, however, these other components have not been explicitly shown in FIG. 2 to avoid congestion. These and other types of pre-processing and the operation of components by which pre-processing may be performed will be well understood by those skilled in the art.

In a communication equipment rack, the L3 TM device 30 may be implemented in generic hardware installed in multiple slots, and the L2 TM device 50 may be implemented on a line card to be installed in one or more slots, as described briefly above.

According to an embodiment of the invention, the controller 70 is also implemented on a line card along with the L2 TM device 50. At least some of the functions of the controller 70, which are disclosed in further detail herein, are preferably implemented in software for execution by a processor in the L2 TM device 50 or an L2 communication device in which the L2 TM device 50 is implemented. This processor may be a dedicated processor or a general purpose processor which performs further functions in addition to TM functions.

Embodiments in which functions of the controller 70 are distributed between communication devices which incorporate the TM devices 30, 50 are also contemplated. For example, a hardware component implementing the queue threshold status detector 72 may be provided on a line card with the L2 TM device 50, whereas software which implements the transfer rate control module 74 runs on a processor which is on the same card as the L3 TM device 30. However, it should be appreciated that no particular division of controller functions is necessary. In fact, virtually any physical distribution of components implementing embodiments of the invention is possible.

In a preferred embodiment, the queue threshold status detector 72 in the controller 70 is implemented using a Field Programmable Gate Array (FPGA) which collects information to be processed by software as described in further detail below. Implementations of the controller 70 using microprocessors, Application Specific Integrated Circuits (ASICs), and other types of processor, instead of or in addition to an FPGA, are also contemplated. An FPGA-based queue threshold status detector 72 may have somewhat of a speed advantage over a controller 70 which is substantially or entirely implemented in software, although those skilled in the art will appreciate that software-based embodiments of the controller 70 are certainly possible.

The principal queuing point for egress communication traffic in FIG. 2 is the L3 TM device 30. Here, customer traffic is queued in one of two queues 32/33, 34/35, 42/43, 44/45 per VC, allowing per-class queuing and shaping. These queues are attached to per-physical-port schedulers 36, 46, which service queues in accordance with an L3 TM scheme. For example, the schedulers 36, 46 may service queues which have not exceeded their respective configured transmission rates in a round-robin fashion.

Communication traffic, in the form of packets for instance, is sent from the L3 TM device 30 by the schedulers 36, 46 and received by the L2 TM device 50. Received communication traffic may be reformatted into ATM cells and subject to further pre-TM processing, and is then queued in the per-VC queues 52, 54, 62, 64. Servicing of these queues is determined by ATM class of service and traffic descriptor parameters, as will be well known to those skilled in the art. The per-VC queues 52, 54, 62, 64 fill up as communication traffic rates from the L3 TM device 30 exceeds the output rate from the L2 TM device 50 towards physical layer devices connected to a communication medium.

The queue threshold status detector 72 in the controller 70 is configured to determine the depth of each per-VC queue 52, 54, 62, 64 in the L2 TM device 50 relative to respective queue thresholds. The determination of queue depths may involve, for example, querying the L2 TM device 50. Some commercially available ATM communication devices which incorporate L2 TM devices output on a proprietary bus the depths of the per-VC queues 52, 54, 62, 64. The L2 TM device 50 may output, for each queue, an absolute queue depth or a queue depth which is relative to a configured maximum, for instance. This queue depth output may be provided, for example, each time the L2 TM device 50 receives or transmits communication traffic. In this case, the output queue depth information may be monitored by the queue threshold status detector 72 in the controller 70.

According to an embodiment of the invention, the L2 TM device 50 outputs queue depths to an FPGA which is used to implement the queue threshold status detector 72. The FPGA is programmed with a respective per-VC threshold for each of one or more of the queues 52, 54, 62, 64. Each queue may have a different corresponding threshold, or the same threshold may be used for multiple queues. The FPGA preferably records and maintains the threshold status of each of the per-VC queues and makes the status available to control software. Queue threshold status information may be maintained in any of a variety of formats. For example, the FPGA may maintain a list of only those queues which have crossed their thresholds or update a depth or threshold status indicator for each queue in a list of all per-VC queues.

The transfer rate control module 74 of the controller 70 periodically determines the threshold status of the per-VC queues, by polling the queue threshold status detector 72 for queue threshold status information, for example. If the transfer rate control module 74 determines that a given per-VC queue has exceeded its threshold, then rate control is applied to the L3 TM device 30 to disable the corresponding L3 queue or queues. This control of a rate of transfer of communication traffic from the L3 TM device 30 to the L2 TM device 50 may be effected by generating a single control signal specifying which of the L3 queues are to be disabled or respective control signals for controlling each of the L3 queues. The transfer rate control module 74, when implemented in software for instance, may instead control the L3 queues by writing to registers on the L3 TM device 30. In this case, the transfer rate control module 74 controls the L3 queues without outputting control signals to the L3 TM device 30.

Although a disabled queue may continue to receive and store communication traffic, it no longer sends communication traffic to its scheduler 36, 46. This functionality might instead be supported in the schedulers 36, 46, in which case the schedulers 36, 46 are responsive to rate control from the controller 70 to stop reading communication traffic from the queues 32-35, 42-45 and sending the traffic to the L2 TM device 50. In some embodiments, the output rates of the queues or schedulers are reduced or throttled responsive to rate control applied by the controller 70. This allows for a reduced rate of communication traffic transfer between the TM devices 30, 50 instead of stopping communication traffic flow entirely.

The disabling of queues or throttling of communication traffic output rates allows the per-VC queues in the L2 TM device 50 to drain, and may cause communication traffic buildup in the L3 TM device 30. When the depth of a queue in the L2 TM device 50 returns to below its threshold, any corresponding disabled queues on the L3 TM device 30 are re-enabled. By this means, the output of communication traffic on a given VC is determined by traffic parameters, illustratively ATM traffic parameters, programmed in the L2 TM device 50, whereas the particular mix of communication traffic in an L2 queue, and thus on a VC where the L2 TM device is implemented in an ATM device, is determined by the L3 communication traffic management parameters in the L3 TM device 30. The controller 70 allows the L2 TM device 50 to be used in conjunction with the L3 TM device 30, regardless of whether the L2 TM device 50 uses a backpressure mechanism, or more generally an input communication traffic transfer rate control mechanism, which is not compatible with the communication traffic management policy of the L3 TM device 30.

Operation of the controller 70 as described above also effectively makes the L2 TM device 50 substantially lossless. Traffic loss due to queue buildup will primarily occur at the L3 TM device 30, and not at the L2 TM device 30, thus enabling class-based traffic discards and discard statistics.

Those skilled in the art will appreciate that hardware tends to operate more quickly than software. Thus, software polling for queue threshold status may be relatively slow with respect to the rate of transfer of communication traffic between the L3 and L2 TM devices 30, 50, and accordingly per-VC queue thresholds are preferably kept relatively large. In order to prevent head-of-line block problems, however, where high-priority traffic is scheduled out of the L3 TM device 30, but then sits in a long per-VC queue behind lower-priority traffic in the L2 TM device 50, multiple queues may be provided in the L2 TM device 50 for each VC.

In FIG. 2, for example, incoming IP traffic has two classes or priorities, BE and EF, which are queued separately at the L3 TM device 30. Two queues per VC might then also be provided at the L2 TM device 50, with communication traffic from the L3 TM device 30 being tagged with its priority at the L3 TM device 30 and queued in the correct queue at the L2 TM device 50. The multiple queues for each VC at the L2 TM device 50 may then be controlled in accordance with strict-priority scheduling or another priority-based scheduling scheme.

A further embodiment of the invention provides for variable queue thresholds for any or all of the per-VC queues at the L2 TM device 50. As described above, the controller 70 monitors depths of queues in the L2 TM device 50 to determine whether corresponding queue thresholds have been crossed. In some situations, it may be desirable to vary the thresholds associated with one or more of the queues of the L2 TM device 50. For example, it is generally preferable to have communication traffic stored in the queues 52, 54, 62, 64, so that the L2 TM device 50 always has communication traffic to transmit. Thus, queue thresholds might be increased if the total of all queue depths is below a threshold, or equivalently if remaining total queue capacity is above a threshold, thereby potentially increasing the rate of communication traffic transfer from the L3 TM device 30 to prevent the L2 TM device 50 from running out of communication traffic. A higher threshold may result in a disabled or restricted L3 queue resuming a normal transfer rate for communication traffic, for example.

Total queue depth or remaining capacity, like individual queue depth, may be determined in any of various ways. Where all per-VC queues obtain memory resources from a common buffer pool, the queue threshold status detector 72 of the controller 70 may query the L2 TM device 50 for buffer depth or remaining capacity, or the L2 TM device 50 may output an indication of buffer depth or remaining capacity. Total queue depth or remaining capacity may instead be calculated by summing all queue depths or remaining capacities. Based on the total depth or remaining capacity, the thresholds of one or more of the per-VC queues may be varied.

According to one embodiment, control software which supports the functions of the controller 70 maintains a table which maps total queue depth or remaining capacity, as a percentage of total queue capacity for example, to a corresponding threshold adjustment factor which is multiplied by a queue's corresponding threshold to calculate an adjusted queue threshold.

Adjusted thresholds are then compared with queue depths to determine whether communication traffic flow from the L3 TM device 30 queues should be stopped or throttled, or alternatively resumed. At higher total queue depths, a threshold adjustment factor of 1 may be used to maintain predetermined queue thresholds, whereas at lower total queue depths, threshold adjustment factors of greater than one may be used to increase thresholds to prevent queue underruns. Alternatively, maximum desired queue thresholds might be set for low total occupancy conditions and adjusted downwards, using adjustment factors of less than 1, when total queue depth or buffer occupancy increases. The total queue depth or remaining capacity levels and multipliers used for queue threshold adjustment are established based on expected or desired communication traffic characteristics or parameters, such as relative incoming and outgoing communication traffic rates, for example.

Variable thresholds may be applied to any or all of the per-VC queues 52, 54, 62, 64 in the L2 TM device 50. According to one possible scheme, variable thresholds are applied on a per physical port basis. In FIG. 2, the thresholds of the queues 52, 54, which queue traffic for one physical port, could be increased or decreased depending on total occupancy levels of those queues.

Another optional feature which may be provided to decrease the likelihood of queues in the L2 TM device 50 draining when corresponding queues in the L3 TM device 30 have been disabled or throttled relates to preferential treatment of backpressured queues. Generally, it is more critical to ensure that L3 queues are turned back on before a corresponding L2 queue drains, than to ensure that the L3 queues are turned off when the corresponding L2 queue exceeds its threshold.

To this end, the controller 70, and preferably the transfer rate control module 74, may maintain a record of any of the queues 52, 54, 62, 64 for which corresponding L3 queues have been disabled or throttled, and perform transfer rate control operations for those queues first. This may be accomplished, for instance, by maintaining a list of L2 queues or VCs for which backpressuring has been applied to corresponding L3 queues, and performing transfer rate control operations first for queues in the list and then for other queues. Two respective lists of L2 queues or VCs for which backpressuring has and has not been applied may also be maintained. A record of backpressuring may instead indicate L3 queues to which backpressuring has and/or has not been applied, with the transfer rate control module 74 then determining corresponding L2 queues which are to be given preference.

Optimizations may also be made to reduce the impact of transfer rate control processing on resources of the TM devices. Thus, in some embodiments, the transfer rate control module 74 keeps track of the last state of a given L2 queue, VC, or L3 queue. If the state of a queue or VC has not changed, e.g., if an L2 queue was below its threshold during a previous iteration of transfer rate control operations and is still below the threshold, then the transfer rate control module 74 need not communicate with the L3 TM device 30. In this manner, transfer rate control is further dependent upon a change in state of a queue in addition to its threshold status.

As described above, queues in an upstream TM device may be disabled or throttled responsive to a depth of a corresponding queue in a downstream TM device exceeding a threshold. Multiple threshold implementations are also contemplated. For example, different levels of throttling may be applied for different queue depths. The transfer rate for an L3 queue might be throttled to different degrees as a corresponding L2 queue reaches successive thresholds, and disabled at some point when the L2 queue reaches a predetermined maximum depth.

Another possible application of multiple thresholds would be to establish two thresholds, a high threshold and a low threshold, per L2 queue. If the depth of a queue is above the high threshold for the queue, then backpressure is applied to reduce a rate of transfer of communication traffic to the queue. The queue is then allowed to drain below its low threshold before the transfer rate is increased or restored. As long as the queue depth remains between the thresholds, the communication transfer rate is preferably not changed. This scheme would work particularly well in a system where, rather than disabling L3 queues, the L3 queues are throttled or turned down and up more gently. In one embodiment, the transfer rate from an L3 TM device is matched with the transmission rate from the L2 TM device, and each L2 queue then remains in the preferred queue depth range defined by the high and low thresholds without applying transfer rate control.

Further possible variations of the above operations include selective backpressuring by effectively enabling or disabling the control of the queues or schedulers at the L3 TM device 30 by the controller 70. Backpressuring may be enabled or disabled on a per-physical port or per-VC basis, for example.

Transfer rate control might also or instead be group-specific, such as port-specific or class-specific. For example, virtual buffer pools, including buffers which are dynamically allocated to L2 queues as needed to store incoming communication traffic, may be maintained and used to backpressure L3 queues. For some applications, including per-port communication traffic isolation, it is desirable to limit the number of buffers, out of the total number of available buffers, used by a particular group of communication traffic. This group may be defined based on the port or the class of the traffic, or the combination of port and class of the traffic, for instance.

The number of buffers used in an L2 virtual buffer pool may then be monitored, and when a group has exceeded its allowed buffer usage, backpressure is applied to an upstream L3 traffic management device, as a hardware-based backpressure signal, for example. The L3 traffic management device can then discard traffic according to the L3 traffic management profile for that particular group.

In one implementation, maintenance of virtual buffer pools is handled by the controller 70 in the system 20 of FIG. 2, possibly by an FPGA used to implement the queue threshold status detector. Any of the above techniques for determining queue depth may similarly be used to determine the size of virtual buffer pools. For example, whenever the L2 TM device 50 receives and queues, or dequeues and transmits, traffic associated with a particular group, it may output information to the controller 70 indicating how many buffers are currently used by L2 queues to store traffic for that particular group. The L2 TM device 50 may also inform the controller 70 of the group, a physical port for instance, with which the traffic is associated. Alternatively, the controller 70 may perform calculations based on individual queue depths or other information, to maintain the virtual buffer pools.

The controller 70 thereby maintains counts of the number of buffers used for each group, or more generally the amount of communication traffic stored, for each group. The controller 70, or possibly the queue threshold status detector 72, is also programmed with virtual buffer pool thresholds for each group. When the number of buffers used for a group exceeds the configured threshold, the controller 70 applies transfer rate control, to the L3 TM device 30. This causes one or more queues or schedulers in the L3 TM device 30 to cease transmitting. As the queues in the L3 TM device 30 build up, they may start to discard. However, these discards can now be made based on L3 TM decisions. As described above, discards and discard statistics at an L3 TM device may be class-aware, whereas discards and statistics at an L2 TM device are not class-aware. Normally, an L2 TM device which supports virtual buffer pools would discard communication traffic when the amount of buffers used for a virtual buffer pool is exceeded. Discard mechanisms include Early Packet Discard (EPD)/Partial Packet Discard (PPD) and/or Weighted Random Early Detection (WRED).

Queue- and virtual buffer pool-based transfer rate control may be handled differently by the controller 70. In one embodiment, the transfer rate control module 74 is implemented in software and applies transfer rate control based on queue depths, such as by writing to registers in the L3 TM device 30, whereas group-specific backpressure is implemented in hardware, using an FPGA in the detector 72 which also detects queue thresholds for instance. Other specific implementations will be apparent to those skilled in the art.

By keeping track of the number of buffers used per-group, illustratively per-physical-port, port isolation is provided. Traffic from one physical port cannot consume all of the available buffers in the L2 TM device 50. Equivalently, a certain number of buffers can effectively be guaranteed for a physical port.

While the above description refers to maintaining counts of the number of buffers used for a physical port, the generic case applies to keeping track of the number of buffers used in an L2 TM device for one or many sets of virtual buffer pools. These virtual buffer pools may correspond to physical ports, particular classes, or any other grouping. Backpressure can thereby be applied to an L3 TM device for the corresponding group/pool.

Figure 3:
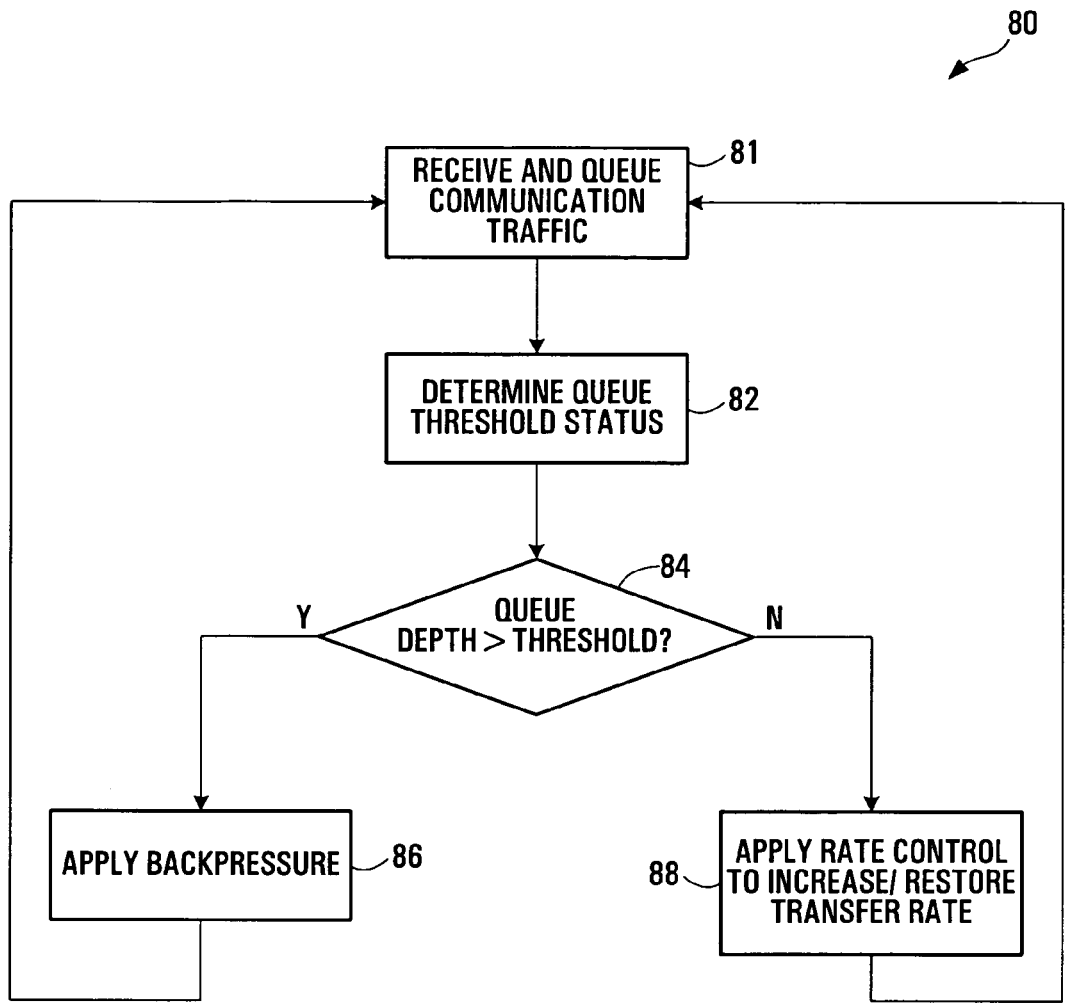
FIG. 3 is a flow diagram of a communication traffic management method according to an embodiment of the invention.

Various embodiments of the invention providing systems for managing transfer of communication traffic between communication traffic management devices have been described in detail above. The present invention also provides communication traffic management methods. FIG. 3 is a flow diagram of a traffic management method according to a further embodiment of the invention.

The communication traffic management method 80 of FIG. 3 begins at 81, with operations of receiving and queuing communication traffic at a TM device. For clarity, the operations indicated at 81 refer to communication traffic receiving and queuing operations performed at a lower layer TM device, illustratively the L2 TM device 50 of FIG. 2.

The method proceeds at 82 with an operation of determining queue threshold status for one or more queues in which the received communication traffic is stored. Transfer rate control for controlling a rate of transfer of communication traffic to the TM device is applied based on the queue threshold status.

The transfer rate control is dependent upon whether or not the depth of any or each particular queue exceeds a respective threshold for that queue. As shown at 84, if the depth of a queue exceeds the threshold for the queue, then backpressure is applied at 86 to an "upstream" TM device from which communication traffic is received. This disables or throttles communication traffic transfer to the TM device from particular corresponding queues in the upstream TM device. Alternatively, if the queue depth does not exceed the queue threshold, then transfer rate control is applied at 88 to increase or restore a rate of communication traffic transfer from corresponding queues in the upstream TM device.

It should be appreciated that the method 80 as shown in FIG. 3 is representative of one embodiment of the invention, and that methods according to other embodiments may involve fewer or further operations which may be performed in a different order than explicitly shown.

For example, although the operations at 81 and 82 are shown in FIG. 3 as sequential operations, a TM device may continue to receive and queue communication traffic as shown at 81 while communication traffic control operations at 82-88 are being performed. Queues may be periodically monitored at 82, for instance, without interrupting communication traffic reception.

Methods according to embodiments of the invention may also include additional operations and features, such as variable queue thresholds, preferential treatment of backpressured queues, state change-based control, multiple thresholds, and priority queuing, which have been described in detail above in the context of communication traffic management systems.

Embodiments of the present invention as disclosed herein thus provide for sophisticated L3 communication traffic management, together with, for example, ATM TM 4.1-compliant communication traffic shaping, using available devices rather than specialized hardware. VC isolation is also provided in some embodiments, so that the communication traffic output per-customer on an ATM port is governed solely by an ATM traffic descriptor, whereas the priority of communication traffic within that VC is governed by an L3 communication traffic management policy.

What has been described is merely illustrative of the application of principles of the invention. Other arrangements and methods can be implemented by those skilled in the art without departing from the scope of the present invention.

For example, references to thresholds being exceeded or crossed should not be interpreted as indicating strictly "greater than" threshold determinations. A threshold may be considered to be exceeded when an associated parameter, queue depth or buffer occupancy for instance, either reaches or exceeds the threshold. Thus, a parameter which is equal to its threshold may or may not be considered as having exceeded the threshold, depending on design preferences.

It should also be appreciated that implementation of a communication device incorporating an embodiment of the present invention in communication equipment does not necessarily preclude the implementation of other types of communication device in the same communication equipment. For example, as described above, substantially the same hardware may be provided in multiple slots in a communication equipment rack. It is contemplated that line cards installed in some slots could incorporate embodiments of the invention, whereas line cards installed in other slots might not.

Embodiments of the present invention may also possibly be applied to other than IP and ATM, or Layer 3 and Layer 2, traffic management devices. The above references to IP/ATM and Layer 3/Layer 2 are intended solely for illustrative purposes.

In addition, although described primarily in the context of methods and systems, other implementations of the invention are also contemplated, as instructions stored on a machine-readable medium, for example.

Embodiments of the invention may also be implemented in situations in which a traffic management device receives communication traffic from more than one other traffic management device. The feedback mechanisms disclosed herein could be applied to any or all of the other traffic management devices from which communication traffic is received.

It is also contemplated that embodiments of the invention disclosed herein may be extended to systems with three or more traffic management devices. A firewall-type communication device, for instance, might perform per-application/per-class/per-VC traffic management by using three traffic management devices and implementing one or more software feedback loops between them.

Another possible implementation of embodiments of the invention would be in conjunction with a single device in which diverse traffic management schemes are applied to communication traffic. In this case, transfer rate control could be applied to control a first traffic management scheme and thereby a rate of transfer of communication traffic for processing in accordance with a second traffic management scheme. Thus, although embodiments of the invention described above are implemented with two separate traffic management devices, the techniques disclosed herein are not limited to situations in which traffic management functions have been divided between separate physical devices in any particular manner. Embodiments of the invention may be used to enable inter-operation of different traffic management schemes which may or may not necessarily be implemented in separate traffic management devices. References herein to traffic management devices should therefore be interpreted accordingly, as encompassing implementations of diverse traffic management schemes in distinct physical devices or possibly a single device.

References to periodically performing operations should also be interpreted in a non-limiting manner. Periodic operations may, but need not necessarily, be performed at regular, fixed time intervals.

We claim:

1. A system for managing transfer of communication traffic between communication traffic management devices which employ respective communication traffic management schemes, a first one of the communication traffic management devices being capable of transferring communication traffic to a second one of the communication traffic management devices, the system comprising:

a queue threshold status detector configured to determine whether an amount of communication traffic currently stored in a communication traffic queue of the second communication traffic management device exceeds a threshold; and a transfer rate control module operatively coupled to the queue threshold status detector and configured to apply transfer rate control to the first communication traffic management device, based on whether the amount of communication traffic exceeds the threshold, to control a rate of transfer of communication traffic to the second communication traffic management device, wherein:

the first communication traffic management device comprises an Internet Protocol (IP) communication traffic management device, and wherein the second communication traffic management device comprises an Asynchronous Transfer Mode (ATM) communication traffic management device;

the IP communication traffic management device comprises a plurality of queues for storing communication traffic received from at least one communication traffic source;

the ATM communication traffic management device comprises a plurality of queues for storing communication traffic received from at least one corresponding queue in the plurality of queues of the IP communication traffic management device for transmission on respective Virtual Circuits (VCs);

the queue threshold status detector is configured to determine whether an amount of communication traffic currently stored in a communication traffic queue of the second communication traffic management device exceeds a threshold by determining, for each of at least one of the plurality of queues of the ATM communication traffic management device, whether the amount of communication traffic currently stored in the queue exceeds a respective threshold associated with the queue; and the transfer rate control module is configured to apply transfer rate control to the IP communication traffic management device, based on whether the amount of communication traffic stored in each of the at least one queue exceeds the threshold associated with the queue, to control a rate of transfer of communication traffic to the ATM communication traffic management device from the at least one corresponding queue of the plurality of queues of the IP communication traffic management device.

2. The system of claim 1, wherein the ATM communication traffic management device is configured to output to the queue threshold status detector respective queue depths indicating the amount of communication traffic stored in the plurality of queues.

3. The system of claim 1, wherein:

the plurality of queues of the IP communication traffic management device comprises respective sets of priority queues for storing communication traffic received from respective communication traffic sources and having respective priorities; and the plurality of queues of the ATM communication traffic management device comprises respective sets of priority queues for storing communication traffic received from the IP communication traffic management device for transmission on respective VCs and having respective priorities.

4. The system of claim 1, wherein the queue threshold status detector comprises a Field Programmable Gate Array (FPGA) configured to determine the amount of communication traffic currently stored in the communication traffic queue of the second communication traffic management device and to compare the amount of communication traffic currently stored in the communication traffic queue to the respective threshold associated with the queue.

5. The system of claim 1, wherein at least the transfer rate control module is implemented in software for execution by a processor.

6. The system of claim 1, wherein at least one of the queue threshold status detector and the transfer rate control module is implemented with the second communication traffic management device on a circuit card for communication equipment, the communication equipment comprising hardware implementing the first communication traffic management device.

7. A communication network element for a communication network, the communication network element comprising:
the system of claim 1;
the first communication traffic management device; and
the second communication traffic management device.

8. A method for managing transfer of communication traffic between communication traffic management devices which employ respective communication traffic management schemes, a first one of the communication traffic management devices being capable of transferring communication traffic to a second one of the communication traffic management devices, the method comprising:

determining whether an amount of communication traffic currently stored in a communication traffic queue of the second communication traffic management device exceeds a threshold; and applying transfer rate control to the first communication traffic management device, based on whether the amount of communication traffic exceeds the threshold, to control a rate of transfer of communication traffic to the second communication traffic management device, wherein:

the first communication traffic management device comprises an Internet Protocol (IP) communication traffic management device, and wherein the second communication traffic management device comprises an Asynchronous Transfer Mode (ATM) communication traffic management device;

the IP communication traffic management device comprises a plurality of queues for storing communication traffic received from at least one communication traffic source;

the ATM communication traffic management device comprises a plurality of queues for storing communication traffic received from at least one corresponding queue in the plurality of queues of the IP communication traffic management device for transmission on respective Virtual Circuits (VCs);

determining comprises determining, for each of at least one of the plurality of queues of the ATM communication traffic management device, whether the amount of communication traffic currently stored in the queue exceeds a respective threshold associated with the queue; and applying comprises applying transfer rate control to the IP communication traffic management device, based on whether the amount of communication traffic stored in each of the at least one queue exceeds the threshold associated with the queue, to control a rate of transfer of communication traffic to the ATM communication traffic management device from the at least one corresponding queue of the plurality of queues of the IP communication traffic management device.

* * * * *